United States Patent
Childers (10) Patent No.: US 7,167,216 B2
(45) Date of Patent: Jan. 23, 2007

(54) PROJECTION SYSTEM WITH ADJUSTABLE ASPECT RATIO OPTICS

(75) Inventor: Winthrop D. Childers, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 501 days.

(21) Appl. No.: 10/713,281

(22) Filed: Nov. 14, 2003

(65) Prior Publication Data

US 2004/0100590 A1 May 27, 2004

Related U.S. Application Data

(63) Continuation-in-part of application No. 10/608,941, filed on Jun. 26, 2003, now Pat. No. 6,860,606, which is a continuation-in-part of application No. 10/349,047, filed on Jan. 21, 2003, which is a continuation-in-part of application No. 10/309,425, filed on Dec. 3, 2002, which is a continuation-in-part of application No. 10/138,765, filed on May 3, 2002.

(51) Int. Cl.
*H04N 3/223* (2006.01)

(52) U.S. Cl. .................. 348/756; 348/747; 348/556

(58) Field of Classification Search ............... 348/756, 348/757, 760, 195, 203, 202, 744, 759, 556, 348/745–747
See application file for complete search history.

(56) References Cited

U.S. PATENT DOCUMENTS

| | | |
|---|---|---|
| 5,384,600 A | 1/1995 | Kaizaki et al. |
| 5,386,236 A | 1/1995 | Hong |
| 5,386,252 A | 1/1995 | Oku |
| 5,408,282 A | 4/1995 | Nagashima et al. |
| 5,418,546 A * | 5/1995 | Nakagakiuchi et al. ....... 345/85 |
| 5,428,454 A | 6/1995 | Kimura et al. |
| 5,475,442 A | 12/1995 | Matsushita et al. |
| 5,486,870 A | 1/1996 | Decreamer |
| 5,486,871 A | 1/1996 | Filliman et al. |
| 5,521,658 A | 5/1996 | Donohoe |
| 5,534,950 A | 7/1996 | Hargis et al. |
| 5,614,961 A * | 3/1997 | Gibeau et al. ............. 348/750 |
| 5,715,021 A | 2/1998 | Gibeau et al. |
| 5,737,123 A | 4/1998 | Donohoe |
| 5,818,546 A | 10/1998 | Opower et al. |
| 5,874,929 A | 2/1999 | Opower et al. |
| 5,920,361 A | 7/1999 | Gibeau et al. |
| 5,956,092 A | 9/1999 | Ebihara et al. |
| 6,020,937 A * | 2/2000 | Bardmesser .............. 348/756 |
| 6,091,461 A * | 7/2000 | Bardmesser .............. 348/744 |
| 6,317,171 B1 | 11/2001 | Dewald |
| 6,340,992 B1 | 1/2002 | Markandey |

\* cited by examiner

*Primary Examiner*—Michael H. Lee (57) ABSTRACT

Adjustable aspect ratio optics is described. In one implementation, a second mirror receives light reflected from a first mirror within the adjustable aspect ratio optics. In accordance with the adjustable nature of the aspect ratio optics, either or both of the first mirror and the second mirror may be configured to make an adjustment to change an aspect ratio of an image created by the reflected light.

34 Claims, 6 Drawing Sheets

104 ADJUSTABLE ASPECT RATIO OPTICS

302 VARIABLE VERTICAL POLYGON MIRROR

304 VARIABLE HORIZONTAL POLYGON MIRROR

*Fig. 3*

104 ADJUSTABLE ASPECT RATIO OPTICS

402 FIXED VERTICAL POLYGON MIRROR

404 GALVANOMETRIC HORIZONTAL POLYGON MIRROR

PROJECTION SYSTEM WITH ADJUSTABLE ASPECT RATIO OPTICS

RELATED APPLICATIONS

This patent application is a continuation-in-part of U.S. patent application Ser. No. 10/608,941, titled "Projector Having Concentrated Beam", by Winthrop Childers, filed on Jun. 26, 2003, now U.S. Pat. No. 6,860,606 commonly assigned herewith, and hereby incorporated by reference.

Application Ser. No. 10/608,941 is itself a continuation-in-part of U.S. patent application Ser. No. 10/349,047, entitled "Projector Having Scanning Optics", by Winthrop Childers, filed on Jan. 21, 2003, commonly assigned herewith, and hereby incorporated by reference, now abandoned.

Application Ser. No. 10/349,047 is itself a continuation-in-part of U.S. patent application Ser. No. 10/309,425, entitled "Projector Having Scanning Optics", by Winthrop Childers, filed on Dec. 3, 2002, commonly assigned herewith, and hereby incorporated by reference.

Application Ser. No. 10/309,425 is itself a continuation-in-part of U.S. patent application Ser. No. 10/138,765, entitled "Projector Having Scanning Optics", by Winthrop Childers, filed on May 3, 2002, commonly assigned herewith, and hereby incorporated by reference.

BACKGROUND

A projector suitable for the projection of digital images typically includes a light source, aspect ratio optics and projection optics. The light source may be LEDs (light emitting diodes), lasers or other high-intensity light source. The aspect ratio optics controls the aspect ratio of the projected image, e.g. a 4:3 aspect ratio (i.e. conventional TV) or a 16:9 aspect ratio (i.e. "wide screen" TV). The aspect ratio optics could include two polygonal mirrors, oriented at right angles to each other. Each mirror is rotated at a controlled speed along an axis perpendicular to all of that mirror's facets. A beam of light from the light source hits a first facet of the first rotating mirror when the facet is at a precisely selected angle, and is then reflected into a second facet on the second rotating mirror. Accordingly, the first rotating mirror may be used to cause the beam to sweep rows of pixels from left to right across a screen, while the second rotating mirror may be used to deflect the beam to result in a plurality of rows from the top of the screen to the bottom of the screen. Thus, the two rotating mirrors result in the aspect ratio of the image. Light leaving the aspect ratio optics passes through projection optics which focuses the light on the screen.

One issue governing the use of rotating polygonal mirrors in the aspect ratio optics is the number of facets to include on each mirror. The smaller the number of facets, the greater the "sweep" of the beam, i.e. the greater the range by which the angle of the beam may be adjusted, and the wider or taller the projected image can be, and the more pixels it can include, at a given distance from the screen and using a given type of projection optics. However, the larger the number of facets, the more frequently the image may be refreshed. Accordingly, during the design phase of the projector, the number of facets on each of the two polygonal mirrors may be selected to result in a preferred ratio of the width of the horizontal and vertical sweeps, balanced by a preferred refresh rate.

The above issue results in a problem, in that the ratio of the height and width of data representing an incoming image may not be the selected ratio of the width of the horizontal and vertical sweeps. That is, the ratio of the height to width of the image data to be projected may not be optimized by the sweeps resulting from the selected number of facets on the mirrors within the aspect ratio optics. This problem may be solved by turning off the light beam for a portion of the time. For example, where the polygonal mirrors were selected to result in a 4:3 aspect ratio, and where data associated with the incoming image is a 16:9 aspect ratio, the top and bottom of the projected image may be eliminated. That is, since the width is fixed, the height must be reduced to conform to the ratio of height to width of the incoming data. The unused top and bottom portions of the screen are familiar to people having 4:3 televisions who watch wide screen movies. Thus, while the polygonal mirrors are scanning through the top and bottom of the screen, the light beam is turned off. Similarly, where the selected ratio of the width of the horizontal and vertical sweeps of the polygonal mirrors was selected for a wider, shorter image, (e.g. widescreen, 16:9) and the incoming data represented a narrower, taller (e.g. 4:3) then vertical strips on the left and right of the screen could be turned off. This is the case where a widescreen 16:9 TV is used to watch conventional 4:3 images.

The above solution, i.e. turning off the light beam to produce unused vertical or horizontal strips, results in an image having the aspect ratio of the incoming data. However, several problems remain. For example, the overall size of the image, due to the unused strips, is smaller than the image the projector is capable of producing. A related issue is that there are a number of pixels which, but for the fact that they were turned off, could have been transmitting information to a viewer. Since these pixels are unused, the viewer receives no benefit from them. Thus, the projector is conveying less data to the user than it would if the aspect ratio of the data were different. Additionally, in part because some of the pixels have been turned off to allow the image to fit within the available viewing area, the incoming data may have to be reduced in resolution to allow projection within the available area; i.e. the incoming data may have to be "dumbed down" in resolution to be displayed with the pixels available, while other pixels remain unused.

A second solution to the problem requires less (or no) reduction in the resolution of the incoming data. This solution is to project as much of the image as will fit, while cropping portions of the image which requires a sweep that is greater than that sweep which one of the polygonal mirrors may provide. (Recall that a polygonal mirror with more facets has less angle of sweep than a polygonal mirror with less facets, but has a greater refresh rate and is capable of making each pixel, to which it can sweep, brighter.) For example, where the projector is suited, due to the sweep associated with the number of facets selected, for projection of a 4:3 image, the central portion of a 16:9 image may be projected, and the left and right sides cropped. This allows the portion of the image projected to be at a maximum level of resolution. However, due to the cropping of the image, some data is not displayed to the viewer.

Accordingly, the viewer would benefit from improved projection systems.

SUMMARY

Adjustable aspect ratio optics is described. In one implementation, a second mirror receives light reflected from a first mirror within the adjustable aspect ratio optics. In accordance with the adjustable nature of the aspect ratio optics, either or both of the first mirror and the second mirror may be configured to make an adjustment to change an aspect ratio of an image created by the reflected light.

BRIEF DESCRIPTION OF THE DRAWINGS

The following detailed description refers to the accompanying figures. In the figures, the left-most digit(s) of a reference number identifies the figure (FIG.) in which the reference number first appears. Moreover, the same reference numbers are used throughout the drawings to reference like features and components.

DETAILED DESCRIPTION

A projector, overhead projector, projection television or other image projection device includes adjustable aspect ratio optics which allows the projection device to adjust in response to an aspect ratio (e.g. 16:9 "widescreen" or 4:3 "full screen") of image data to be projected. In one implementation, spinning first and second polygonal mirrors are associated with vertical and horizontal sweep. The number of facets on each polygonal mirror is inversely proportional to an angle through which the mirror may sweep a light beam, and proportional to the rate at which the image may be refreshed. At least one of the polygonal mirrors is adjustable, to allow variance of the number of facets present in the path of the light beam. By varying the number of facets at least one of the polygonal mirrors puts into the path of the light beam, the ratio of the numbers of degrees by which the two polygonal mirrors sweep the beam of light can be adjusted. By adjusting the ratio formed between the numbers of degrees by which the two mirrors sweep a beam of light to match the aspect ratio of the data to be projected, the image may be advantageously projected. In a second implementation, a galvanometric mirror may be adjusted to result in a ratio of mirror sweeps that is compatible with the aspect ratio of the image to be projected.

Figure 1:
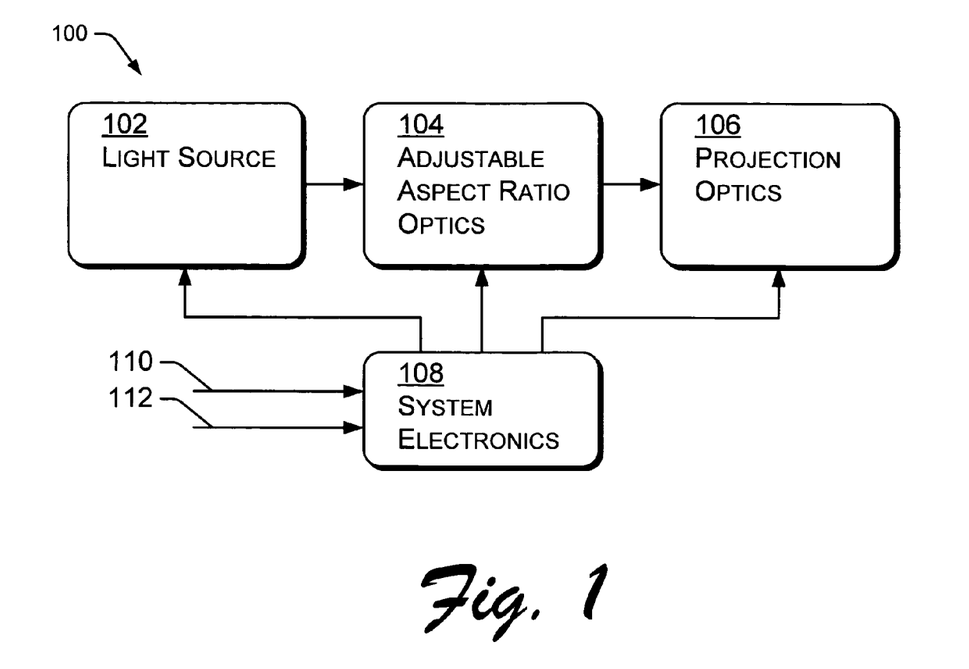
FIG. 1 is block diagram showing an exemplary projector system wherein adjustable aspect ratio optics is responsive to the viewing pattern indicated by the incoming signal.

FIG. 1 is block diagram showing an exemplary projector system 100 having adjustable aspect ratio optics that adjusts in accordance with the aspect ratio associated with data to be projected, thereby more advantageously projecting an image associated with the data. In particular, a light source 102 may be LEDs, laser(s) or other source, as desired. As will be seen in greater detail below, one implementation of the adjustable aspect ratio optics 104 allows for adjustment of an aspect ratio associated with the sweeps of mirrors contained within the adjustable aspect ratio optics 104. In particular, the adjustable aspect ratio optics 104 allows adjustment of the quotient formed by the measure in degrees or radians by which a first mirror may reflect light over the measure in degrees or radians by which a second mirror may reflect light. In one implementation, the adjustable aspect ratio optics 104 allows selection between settings compatible with two or more aspect ratios, thereby allowing selection of the aspect ratio most compatible with the aspect ratio of data to be projected. Projection optics 106 receives an image from the adjustable aspect ratio optics 104 and focuses the image on a screen (not shown).

An alternative implementation of the adjustable aspect ratio optics 104 includes one or more refractive lens within the light path. Accordingly, while the below description is directed primarily at the use of reflective optics (e.g. mirrors), refractive optics could be substituted or added to the use of mirrors. For example, while the below disclosure indicates that first and second polygonal mirrors could be alternated depending on a desired effect; in an alternative implementation, refractive optics could be substituted for the reflecting (mirrored) optics. The refractive lenses could be used in addition to, or in replacement for, the first and second polygonal mirrors. In particular, refractive optics such as rotating prisms could be utilized. In an alternative implementation, refractive optics having a design responsive to an input voltage (i.e. where the degree of refraction is a function of an input signal) could be used in a manner similar to the reflective optics described. Accordingly, one implementation of the adjustable aspect ratio optics 104 includes refractive optics, particularly including refractive optics such as a rotating prism, or refractive optics wherein a degree of refraction is responsive to an input signal.

System electronics or controller 108 controls the light source 102, the adjustable aspect ratio optics 104 and the projection optics 106. Additionally, the system electronics 108 receives the video stream 110 and other input 112 for processing. In particular, the system electronics includes software, firmware or hardware to determine an aspect ratio of image data, such as from within the video stream 110. Additionally, the system electronics 108 adjusts the aspect ratio of the adjustable aspect ratio optics 104, such as by adjustment of the sweep of one or more mirrors.

Figure 2:
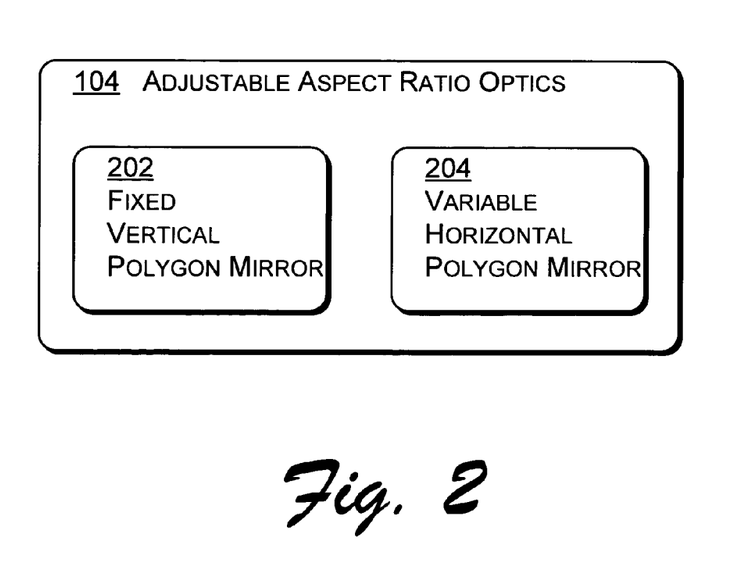
FIG. 2 is a first exemplary implementation of the adjustable aspect ratio optics of FIG. 1.

FIG. 2 is a first exemplary implementation of the adjustable aspect ratio optics 104 of FIG. 1. A first scanning optical element, illustrated by a fixed vertical polygonal mirror 202 and a second scanning optical element, illustrated by a variable horizontal polygonal mirror 204, provide control over the projection of the vertical and horizontal deflection of the projected image, respectively. The vertical polygonal mirror 202 is "fixed" in the sense that the number of sides which form the polygon is fixed by an initial engineering design choice, and cannot be varied during use. The initial engineering design and manufacturing decision may include using a smaller number of sides (e.g. six sides) to provide a greater range of angles by which light may be deflected; alternatively, a larger number of sides (e.g. eight sides) may be used to provide a greater rate of refresh (i.e. a shorter period of time between writing information to each pixel).

The variable horizontal polygonal mirror 204 is "variable" in that it may be switched between two or more positions or modes, wherein each position or mode is associated with a different range through which it can deflect the light beam. For example, where an exemplary variable horizontal polygonal mirror 204 includes six- and eight-side polygonal mirrors, the variable horizontal polygonal mirror 204 a greater range of angles by which light may be deflected or a greater refresh rate, respectively. The system electronics 108 can be configured to place either the six-sided or the eight-sided polygonal mirror into the light path, thereby allowing selection between a wider screen or a greater refresh rate, as desired.

Figure 3:
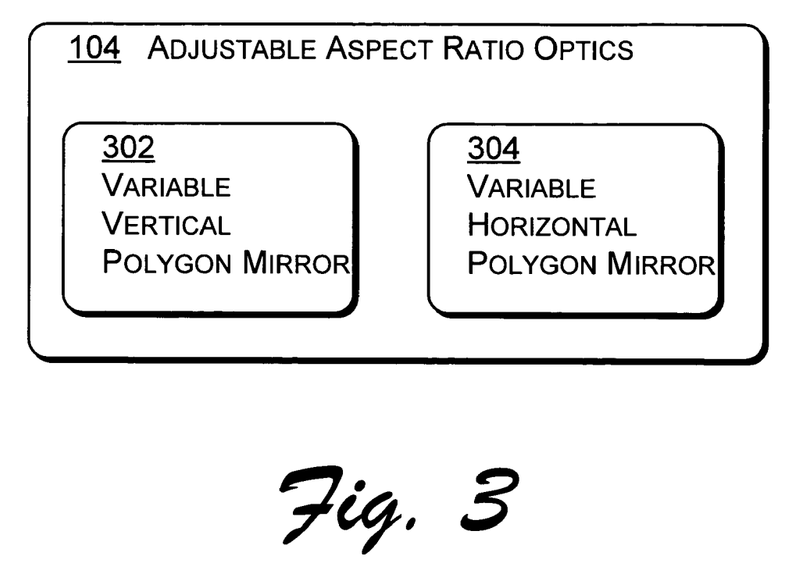
FIG. 3 is a second exemplary implementation of the adjustable aspect ratio optics of FIG. 1.

FIG. 3 is a second exemplary implementation of the adjustable aspect ratio optics 104 of FIG. 1, wherein first and second scanning optical elements 302, 304 are used to provide vertical and horizontal deflection. In particular, a variable vertical polygonal mirror 302 and a variable horizontal polygonal mirror 304 provide control over the projection of the vertical and horizontal deflection of the projected image, respectively. As will be seen in greater detail below, both the variable vertical polygonal mirror 302 and variable horizontal polygonal mirror 304 include two or more polygonal mirrors, either of which may be moved into the path of the light from light source 102.

Figure 4:
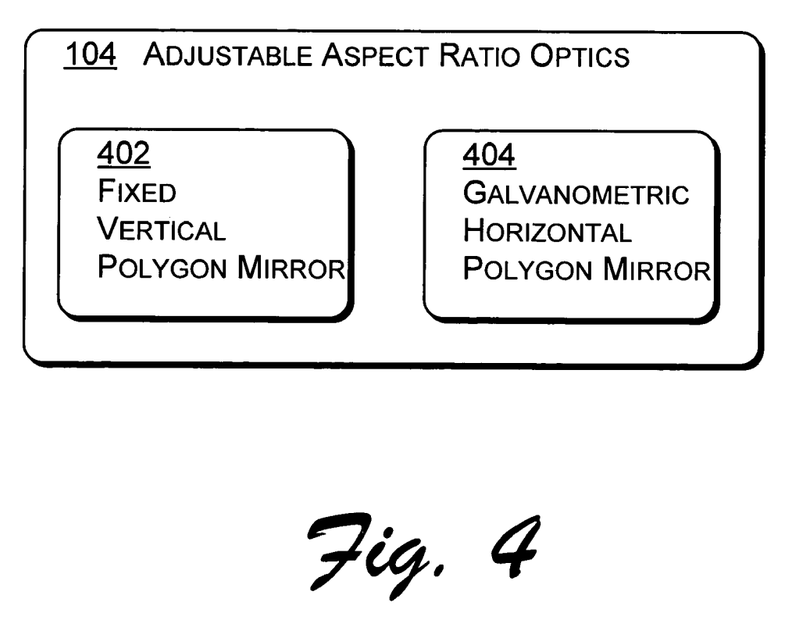
FIG. 4 is a third exemplary implementation of the adjustable aspect ratio optics of FIG. 1.

FIG. 4 is a third exemplary implementation of the adjustable aspect ratio optics of FIG. 1, wherein first and second scanning optical elements 402, 404 are configured to control vertical and horizontal deflection. In particular, a fixed vertical polygonal mirror 402 and a galvanometric horizontal polygon mirror 404 provide control over the projection of the vertical and horizontal deflection of the projected image, respectively. The fixed vertical polygonal mirror 402 has a fixed number of facets, and is rotated under the control of the system electronics 108. The variable galvanometric horizontal polygonal mirror 404 may be configured to have a desired sweep, and to thereby deflect light from the source 102 (FIG. 1) to a desired degree. An exemplary galvanometric mirror 600 is seen in FIG. 6A, and may be used for horizontal or vertical deflections. Accordingly, the ratio between the sweep of the fixed vertical polygonal mirror 402 and the sweep of the variable horizontal polygonal mirror 404 is adjustable.

Figure 5:
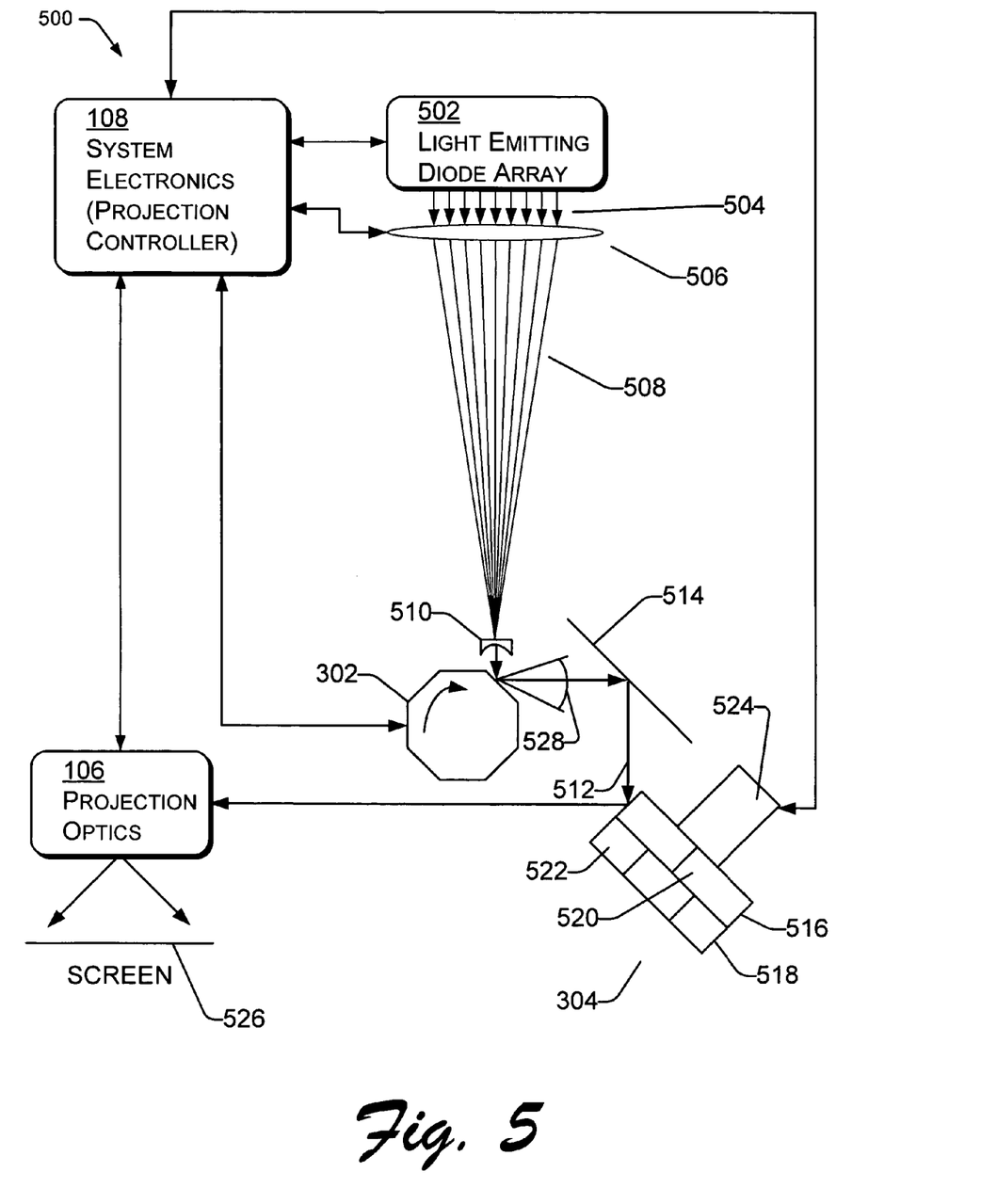
FIG. 5 shows exemplary detail of a projector system, having fixed vertical and variable horizontal polygon mirrors.

FIG. 5 shows exemplary detail of a projector system 500 having fixed vertical polygonal mirror and a variable horizontal polygon mirror, as seen in FIG. 2. System electronics 104 receives image data as an input (not shown) and controls the operation of various components, as seen below. The system electronics 108 controls the operation of a LED or laser array 502, which produces an array of light beams 504 which pass through a lens 506. The lens 506 results in converging light beams 508, which enter a collimating lens 510. The collimated light 512 strikes a facet of the first rotating polygonal mirror 302, which is part of the adjustable aspect ratio optics 104 (FIG. 1). The light reflects off the facet of the first rotating polygonal mirror 302 and is typically reflected by a mirror 514 onto a facet of a second rotating polygonal mirror 304. The light is reflected off the facet of the second rotating polygonal mirror 304 into the projection optics 106 and onto a screen 526.

It should be noted that the first and second mirrors 302, 304 within the adjustable aspect ratio optics 104 (FIG. 1) contain eight and six facets, respectively. Thus, the ratio of the horizontal to vertical is 4:3. This can be seen because the vertical sweep (i.e. the angular range 528 within which the light 512 may be reflected by a facet of the polygonal mirror 302) is 90 degrees. The horizontal sweep is 360 degrees over six facets, or 120 degrees, resulting in the 120/90 or 4:3 aspect ratio.

The aspect ratio may be changed by changing the number of facets on one or both of the mirrors 302, 304. For example, polygonal mirror 304 includes two polygons, thereby allowing for a selection of a desired number of facets. First, a currently used polygon 516 having six facets, two of which 520 are visible due to the orientation of the polygonal mirror 516; and second, a polygonal mirror 518 which is not in use has eight facets, three of which 522 are visible due to the orientation of the polygonal mirror 518.

Note that while FIG. 5 illustrates a light path configured for reflective (mirrored) optics, FIG. 5 could easily be reconfigured to support refractive optics (e.g. prisms). Thus, FIG. 5 illustrates concepts easily implemented in either reflective or refractive optics.

Figure 6:
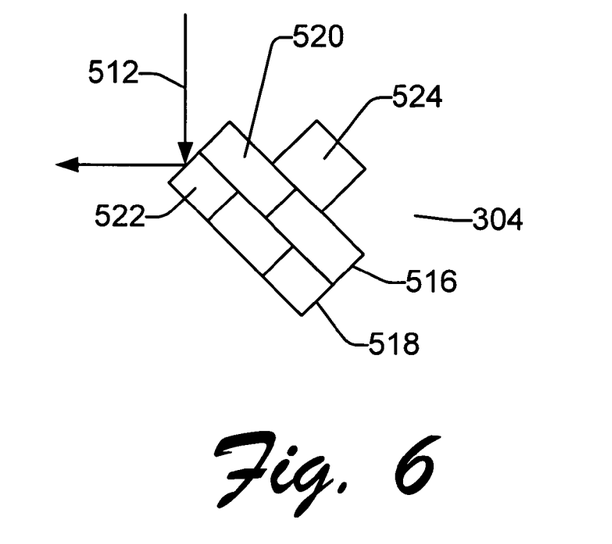
FIG. 6 shows the variable horizontal polygonal mirror of FIG. 5 in an alternative position, thereby exposing a different number of facets to the light beam.
Figure 6A:
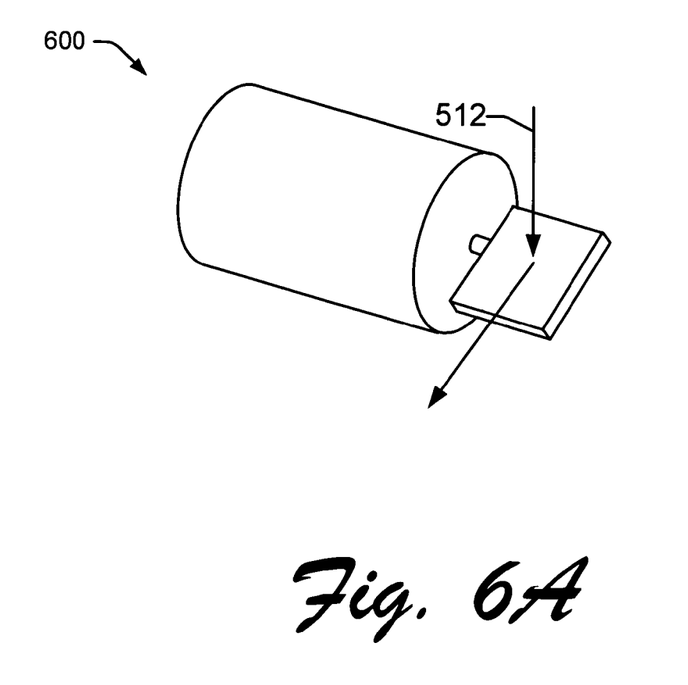
FIG. 6A shows an exemplary galvanometric mirror, which in some applications may be used in place of one or more of the polygonal mirrors of FIGS. 5 and 6.

FIG. 6 shows the variable polygonal mirror 304 of FIG. 5 in an alternative position, wherein the polygon 518 is in the path of the beam. Note that a mirror mover assembly 524 has pulled the polygon 518 into the path of the beam 512, and moved the polygon 516 out of the path of the beam. While the mirror mover 524 illustrates axial movement of a mirror 304 between first and second positions (as illustrated by FIGS. 5 and 6, respectively), the mirror mover 524 could alternatively move two or more separate mirrors, wherein one of the separate mirrors would be moved into the light path 512 and the another of the separate mirrors would be moved out of the light path. The separate mirrors could be selected from among a cassette or magazine holding alternative mirrors.

Figure 7:
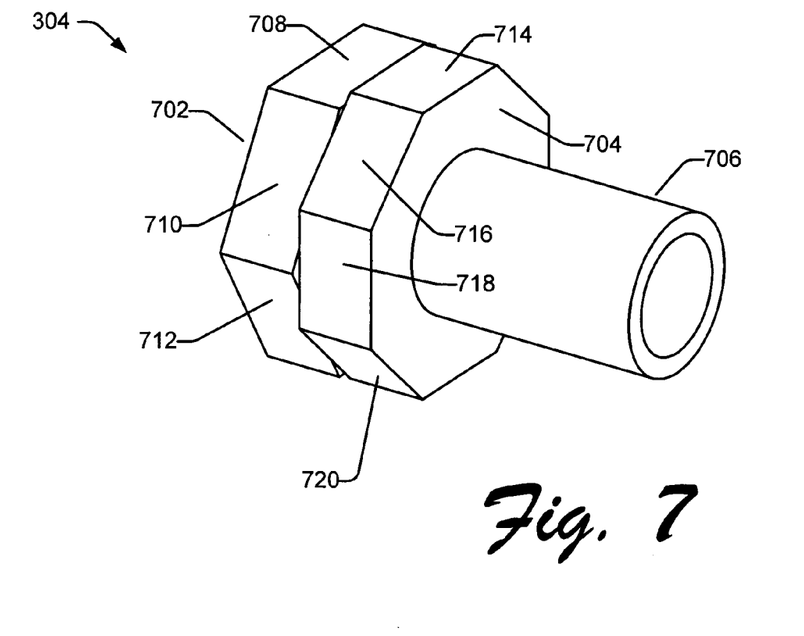
FIG. 7 shows an isometric view of an exemplary variable polygonal mirror.

FIG. 7 shows an isometric view of exemplary adjustable aspect ratio optics, in this case implemented by a polygonal mirror 304. The polygonal mirror includes first and second scanning optical elements, implemented by the six-sided mirror 702 and the eight-sided mirror 704. An axel 706 is adapted for attachment to the mirror moving assembly 524 (FIGS. 5 and 6), thereby allowing either of the mirrors 702, 704 to be put into the light path. The six-sided mirror 702 includes three facets 708–712 visible in this view, while the eight-sided mirror includes four facets 714–720 visible in this view. Note that while FIG. 7 has been described in terms of reflective (i.e. mirrored) optics, FIG. 7 could alternatively be described in terms of refractive optics. In a refractive implementation, a scanning optical element 304 would include two prisms, each having a different number of facets. Also note that the number of facets of a prism or polygonal mirror would be based on the implementation.

Figure 8:
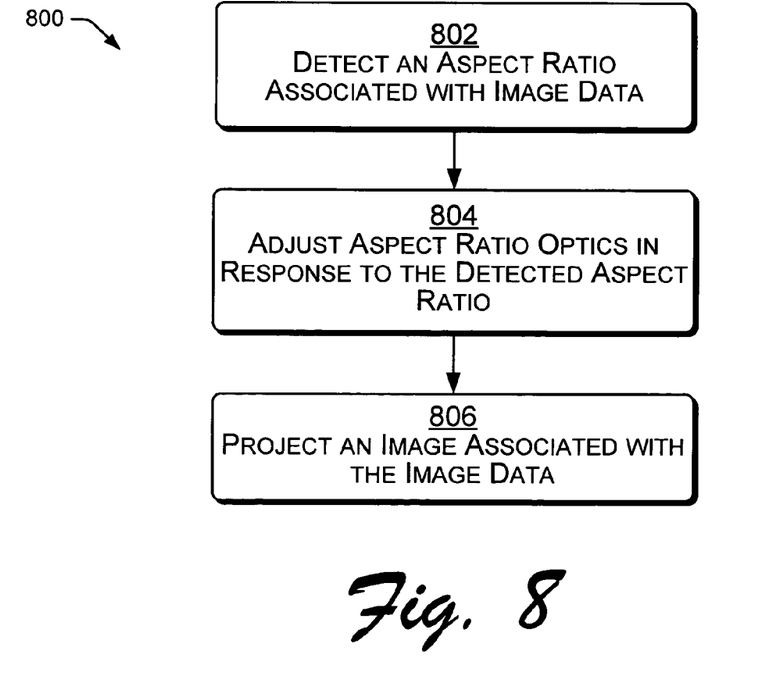
FIG. 8 shows a flow diagram that describes a first exemplary implementation for adjusting the adjustable aspect ratio optics of a projection system in response to incoming data.

FIG. 8 shows a flow diagram that describes an exemplary implementation 800 for adjusting the adjustable aspect ratio optics 104 of a projection system 100 in response to incoming data. At block 802, image data is examined to detect the aspect ratio of the images. For example, where incoming image data 110 (FIG. 1) is associated with widescreen images, the aspect ratio 16:9 is detected. The detection may be made by the system electronics 108, which may include a processor or dedicated application specific integrated circuit (ASIC). In most applications, the processor will execute programming statements read from computer readable media, which will enable the data 110, 112 to be analyzed and the aspect ratio associated with the data to be determined. At block 804, the aspect ratio optics 104 is adjusted in response to the detected aspect ratio. For example, where a "full screen" or a "widescreen" aspect ratio is detected, the aspect ratio optics 104 is adjusted accordingly. In one implementation, the aspect ratio optics 104 may be adjusted by moving a polygonal mirror having more than one polygon to select a desired numbers of facets for utilization. For example, the mirror mover 524 exposes the six facet mirror to the light beam 512 in FIG. 5, but exposes the eight facet mirror to the light beam 512 in FIG. 6. At block 806, an image associated with the image data is projected, such as on a movie/slide-show screen, TV screen or other screen.

Figure 9:
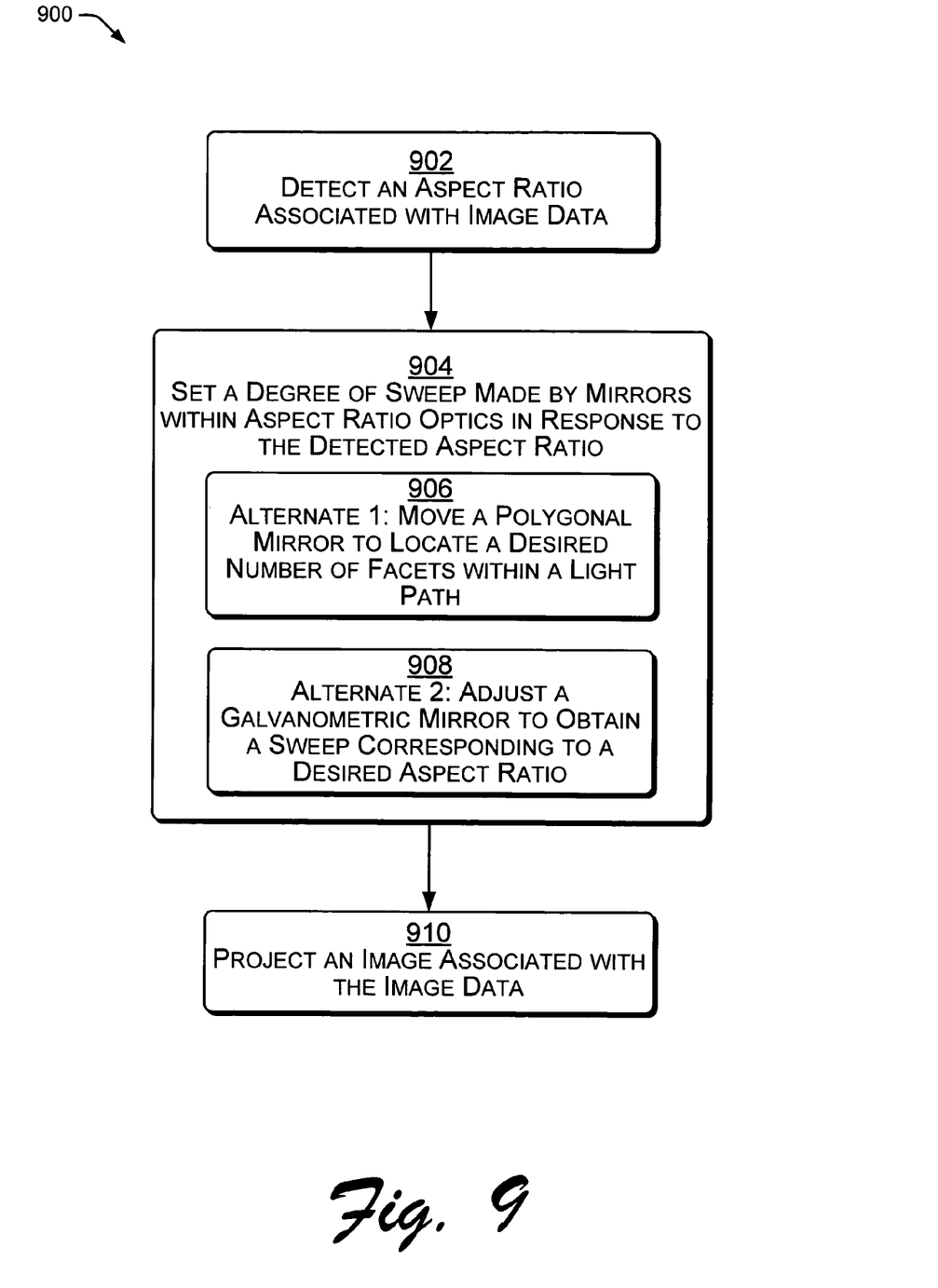
FIG. 9 shows a flow diagram that describes a second exemplary implementation for adjusting the adjustable aspect ratio optics of a projection system in response to incoming data.

FIG. 9 shows a flow diagram that describes a second exemplary implementation 900 for adjusting the adjustable aspect ratio optics 104 of a projection system 100 in response to incoming data. At block 902, image data is examined to detect the aspect ratio of the images. For example, where incoming image data 110 (FIG. 1) is associated with full screen images, the aspect ratio (4:3) is detected. At block 904, a degree of sweep (i.e. the angular range 528 within which light 512 may be reflected by a mirror) made by mirrors 302, 304 within adjustable aspect ratio optics 104 is set in response to the aspect ratio detected in block 902. This may be performed in a number of ways, two of which are listed here, and others of which are seen within other locations of this specification. In a first alternative, at block 906, a polygonal mirror (e.g. mirror 304) is moved to locate a desired number of facets within a light path 512. For example, as seen by a comparison of FIGS. 5 and 6, the mirror mover 524 moves the mirror 304 to expose either polygonal mirrors having six facets 516 or eight facets 518 to the light path 512.

In a second alternative, at block 908, a galvanometric mirror 404 is adjusted to result in the sweep needed to result in the desired aspect ratio (i.e. the aspect ratio that was detected at block 902). At block 910, an image associated with the image data is projected, such as on a movie/slide-show screen, TV screen or other screen.

Although the above disclosure has been described in language specific to structural features and/or methodological steps, it is to be understood that the appended claims are not limited to the specific features or steps described. Rather, the specific features and steps are exemplary forms of implementing this disclosure. For example, while actions described in blocks of the flow diagrams may be performed in parallel with actions described in other blocks, the actions may occur in an alternate order, or may be distributed in a manner which associates actions with more than one other block. And further, while elements of the methods disclosed are intended to be performed in any desired manner, it is anticipated that computer- or processor-readable instructions, performed by a computer and/or processor, typically located within a projector, reading from a computer- or processor-readable media, such as a ROM, disk or CD ROM, would be preferred, but that an application specific gate array (ASIC) or similar hardware structure, could be substituted.

The invention claimed is:

1. Adjustable aspect ratio optics, comprising:
   a first scanning optical element;
   a second scanning optical element to receive light from the first scanning optical element; and
   wherein at least one of the first scanning optical element and the second scanning optical element is configured to allow adjustment of an aspect ratio associated with sweeps of the first and second scanning optical elements, wherein the adjustment comprises shifting between use of first and second polygons, wherein the polygons have different numbers of facets and together form one scanning optical element.

2. The optics of claim 1, wherein the first and second scanning optical elements are refractive optics, respectively.

3. The optics of claim 1, wherein the first and second scanning optical elements are first and second mirrors, respectively.

4. The optics of claim 3, additionally comprising:
   system electronics to determine an aspect ratio of image data and to perform the adjustment of the aspect ratio associated with the sweeps of the first and second mirrors.

5. The optics of claim 1, wherein the shift between polygons balances image size and image refresh rate.

6. The optics of claim 1, wherein the first and second polygons are associated with widescreen and full screen aspect ratios, respectively.

7. The optics of claim 3, wherein one of the first and second mirrors is a galvanometric mirror.

8. The optics of claim 3, additionally comprising:
   a mirror mover, attached to at least one mirror, to move the attached mirror between first and second positions corresponding to first and second aspect ratios, respectively.

9. The optics of claim 3, wherein the adjustment replaces at least one of the first and second mirrors with another mirror.

10. The optics of claim 3, wherein the adjustment configures the first mirror associated with a first sweep and the second mirror associated with a second sweep to form an aspect ratio consistent with a desired aspect ratio.

11. The optics of claim 1, wherein the shift comprises moving the first and second polygons of one scanning optical element in an axial direction.

12. A projection system, comprising:
   a light source;
   a first mirror to reflect light from the light source;
   a second mirror to receive light reflected from the first mirror; and
   a system controller to detect an aspect ratio associated with data to be projected, and to make an adjustment of at least one of the first and second mirrors in response to the detected aspect ratio;
   wherein at least one of the first and second mirrors is a variable polygonal mirror comprising first and second polygons having different numbers of facets.

13. The system of claim 12, wherein the adjustment alters a number of facets used to reflect light by a polygonal mirror portion of the first or second mirror.

14. The system of claim 12, additionally comprising:
   a mirror mover, attached to at least one of the first and second mirrors, to move the attached mirror between first and second positions in response to the detected aspect ratio.

15. The system of claim 12, wherein one of the first and second mirrors is a galvanometric mirror.

16. The system of claim 12, wherein the adjustment replaces at least one of the first and second mirrors with another mirror.

17. The system of claim 12, wherein the first and second polygons are associated with widescreen and full screen, respectively.

18. The system of claim 12, wherein the variable polygonal mirror is slid axially to result in a shift between use of the first and second polygonal mirrors.

19. The optics of claim 12, wherein the adjustment configures a first sweep associated with the first mirror and a second sweep associated with the second mirror to form a ratio consistent with a desired aspect ratio.

20. The optics of claim 12, wherein the at least one mirror is moved between first and second locations by a mirror mover.

21. A processor-readable medium comprising processor-executable instructions for:
examining image data to determine an aspect ratio associated with image data; and
adjusting a degree of sweep made by mirrors within aspect ratio optics in response to the detected aspect ratio, wherein adjusting the degree of sweep includes instructions for moving a variable polygonal mirror in an axial direction to shift between utilization of first and second polygonal mirrors forming the variable polygonal mirror.

22. A processor-readable medium as recited in claim 21, comprising further instructions for:
projecting an image according to the image data using the adjusted aspect ratio optics.

23. A processor-readable medium as recited in claim 21, wherein adjusting the degree of sweep includes instructions for:
moving a polygonal mirror to locate a desired number of facets within a light path.

24. A processor-readable medium as recited in claim 21, wherein adjusting the degree of sweep includes instructions for:
adjusting between widescreen and full screen aspect ratios.

25. A processor-readable medium as recited in claim 21, wherein adjusting the degree of sweep includes instructions for:
varying a number of facets associated with a polygonal mirror within the aspect ratio optics.

26. A processor-readable medium as recited in claim 21, wherein adjusting the degree of sweep includes instructions for:
selecting between polygonal mirrors to obtain a sweep resulting in a desired aspect ratio.

27. A processor-readable medium as recited in claim 21, wherein adjusting the degree of sweep includes instructions for:
adjusting a galvanometric mirror to result in an adjusted angle of sweep.

28. A projection system, comprising:
means for detecting an aspect ratio associated with image data; and
means for adjusting aspect ratio optics in response to the detected aspect ratio, wherein the adjusting comprises means for moving a variable polygonal mirror to result in a shift between utilization of first or second polygonal mirrors, wherein the polygonal mirrors have different numbers of facets, and wherein the polygonal mirrors together form the variable polygonal mirror.

29. The projection system of claim 28, additionally comprising:
means for projecting an image according to the image data using the adjusted aspect ratio optics.

30. The projection system of claim 28, additionally comprising:
means for moving a polygonal mirror in response to the detected aspect ratio to locate a desired number of facets within a light path.

31. The projection system of claim 28, wherein the means for adjusting aspect ratio optics comprises:
means for adjusting between widescreen and full screen aspect ratios.

32. The projection system of claim 28, additionally comprising:
means for adjusting a sweep associated with a mirror within the aspect ratio optics.

33. The projection system of claim 28, additionally comprising:
means for selecting between polygonal mirrors to obtain a sweep resulting in a desired aspect ratio.

34. The projection system of claim 28, additionally comprising:
means for adjusting a galvanometric mirror to select a desired angle of sweep.

* * * * *